(12) United States Patent
Huang et al.

(10) Patent No.: US 6,775,584 B1
(45) Date of Patent: Aug. 10, 2004

(54) OPERATION-SUPERVISION INTEGRATED INTERFACE

(75) Inventors: Chien-Chung Huang, Taichung (TW); Hsiao-Lung Chu, Hsin-Chu (TW); Yu-Feng Huang, Tainan (TW)

(73) Assignee: Taiwan Semiconductor Manufacturing Company, Hsin-Chu (TW)

(*) Notice: Subject to any disclaimer, the term of this patent is extended or adjusted under 35 U.S.C. 154(b) by 89 days.

(21) Appl. No.: 09/942,289

(22) Filed: Aug. 30, 2001

(51) Int. Cl.[7] .............................................. G06F 19/00
(52) U.S. Cl. ..................... 700/121; 700/100; 700/99; 700/108
(58) Field of Search ................................ 700/121, 100, 700/99, 108

(56) References Cited

U.S. PATENT DOCUMENTS

| | | | | |
|---|---|---|---|---|
| 3,585,601 A | * | 6/1971 | Lahrson et al. ............. | 718/101 |
| 5,239,487 A | | 8/1993 | Horejsi et al. .............. | 364/552 |
| 5,367,624 A | * | 11/1994 | Cooper ....................... | 345/734 |
| 5,423,716 A | * | 6/1995 | Strasbaugh .................. | 451/388 |
| 5,463,555 A | * | 10/1995 | Ward et al. ................... | 700/96 |
| 5,778,386 A | | 7/1998 | Lin et al. .................. | 707/200.1 |
| 5,960,417 A | | 9/1999 | Pan et al. .................... | 705/400 |
| 5,999,920 A | | 12/1999 | Sato et al. .................. | 705/400 |
| 6,263,255 B1 | * | 7/2001 | Tan et al. .................... | 700/121 |
| 6,345,259 B1 | * | 2/2002 | Sandoval ....................... | 705/7 |
| 6,401,217 B1 | * | 6/2002 | Clark et al. ................... | 714/20 |

FOREIGN PATENT DOCUMENTS

WO    WO 01/50209    * 6/2001    .................. 700/96

* cited by examiner

*Primary Examiner*—Leo Picard
*Assistant Examiner*—Michael D. Masinick
(74) *Attorney, Agent, or Firm*—George O. Saile; Stephen B. Ackerman; Douglas R. Schnabel

(57) ABSTRACT

A new software support package is provided that monitors tool status and scheduling requirements in a semiconductor manufacturing environment. A multiplicity of tools interfaces with a Manufacturing Execution system (MES) that is a functional component of the Operation and supervision integrated MES user Interface (OMI). A User Interface (UI) function, which is also part of the OMI, interfaces between a multiplicity of users (of the OMI functions) and the MES sub-component of the OMI system.

10 Claims, 1 Drawing Sheet

OPERATION-SUPERVISION INTEGRATED INTERFACE

BACKGROUND OF THE INVENTION (1) Field of the Invention

The invention relates to the fabrication of integrated circuit devices, and more particularly, to a method for improved control of a semiconductor-manufacturing environment.

(2) Description of the Prior Art

The creation of semiconductor devices entails many interacting and mutually supporting technical disciplines, most of these disciplines address the technical aspects of creating semiconductor devices. Equally important is the support and technical capabilities of activities that are required in order to perform the creation of semiconductor devices in an organized and well-controlled manner. This is an aspect of semiconductor manufacturing control that is frequently addressed by software support packages under names like Manufacturing Information System, Management Information System, and the like. Such systems are typically and in the most general meaning required to provide on a real time basis all information of logistics and product flow that relates to the semiconductor manufacturing operation. For instance: what product is currently being produced using what tools and facilities, what for a particular product is the product yield, what are the yield detractors and are these yield detractors changing with time, tool status such as which tools are operational, which tools must be scheduled for Preventive Maintenance, status of new tools ordered and a plan to integrate new tools into current operations, and numerous other records that for instance effect purchasing, basic material supplies and the re-ordering of same, etc.

The overall objective of information handling that is associated with the manufacturing of semiconductor devices is cost control, any inefficiency in data handling results in loss of control and therefore in increased product cost. Since one of the main factors that contributes to product cost is incurred by the tools that are required to create semiconductor devices, control of these tools is essential to the success of a semiconductor manufacturing facility. This implies that tool status must be closely controlled in addition to all other tool-related factors that have a negative impact on product cost. This cannot be interpreted as meaning only that it must be possible to view or be informed about operational status of all tools at any given time, although that is certainly one of the basic requirements of a data handling system. In addition, it must be possible with a high probability of success to predict future tool performance so that a tool can be removed for maintenance or updating activities before the tool breaks down. It must further be possible to gain insight into particular activities within a given tool that have a negative impact on overall cost performance of the manufacturing facilities so that this negative effect can be eliminated or as a minimum can be reduced. Ideally, this level of control can be exercised without human intervention, in reality however human intervention is frequently required so that complex issues, which are either not predictable or which may be too cumbersome for software control functions, can be handled as soon as these issues arise. For this and other reasons is it a basic and essential requirement that operational capabilities, in whichever way they capabilities are provided, are as complete as possible and span the full scope of operational conditions and exceptions thereto. The invention provides for one aspect of tool control by providing an interface for effective control of production tools in a semiconductor-processing environment.

U.S. Pat. No. 5,778,386 (Lin et al.) shows a global view management system for semiconductor plants.

U.S. Pat. No. 5,960,417 (Pan et al.) shows an IC manufacturing control system.

U.S. Pat. No. 5,999,920 (Sato et al.) shows a system for management of a plant.

U.S. Pat. No. 51239,487 (Horejsi et al.) shows a CIM rework method.

SUMMARY OF THE INVENTION

A principle objective of the invention is to provide current and accurate information relating to tool status and tool scheduling requirements in a semiconductor-manufacturing environment.

In accordance with the objectives of the invention a new software support package is provided that monitors tool status and scheduling requirements in a semiconductor-manufacturing environment. A multiplicity of tools interfaces with a Manufacturing Execution system (MES) that is a functional component of the Operation and supervision integrated MES user Interface (OMI). A User Interface (UI) function, which is also part of the OMI, interfaces between a multiplicity of users (of the OMI functions) and the MES sub-component of the OMI system.

DESCRIPTION OF THE PREFERRED EMBODIMENTS

Figure 1:
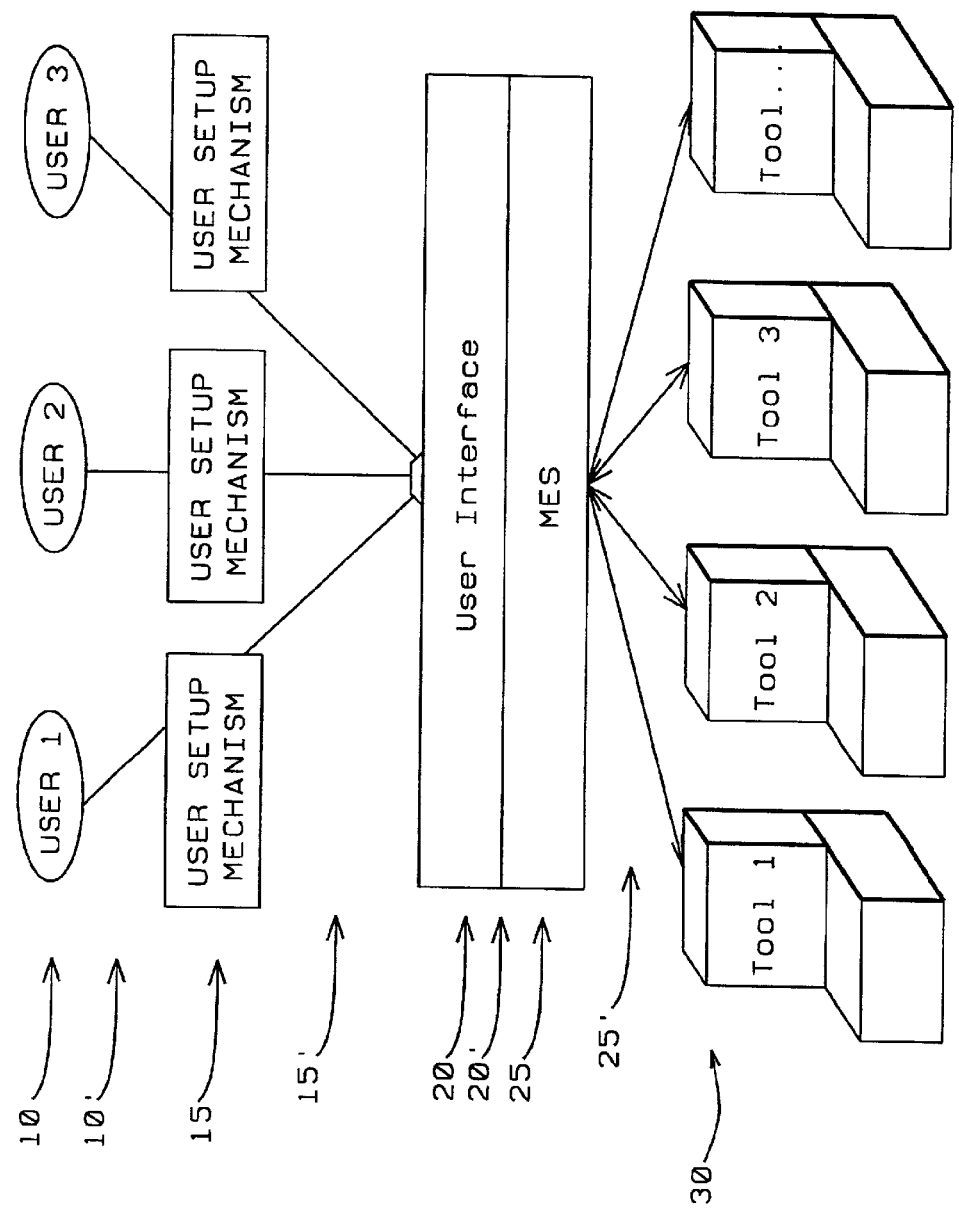
FIG. 1 is the one and only drawing of this application and shows a flow chart of the system flow of the Operation and supervision integrated MES user Interface (OMI) of the invention.

Previous problems and bottlenecks that are part of the prior art method of controlling a semiconductor manufacturing facility or foundry can be highlighted as follows:

no current and up-to-date data are available that reflect tool status the present method is based on numerous screens that must be consulted in order to collect and assemble a collection of data that relate to one particular tool for each display of data that are provided relating to tool status, entries must be sorted in order to derive data that relate to one particular tool the user is unable to identify or to create the process flow for a particular product tool mode of operation cannot be controlled via a user interface, making it impossible to assign to a particular tool such operational conditions as auto-dispatching of product, auto-handling and transportation of product, auto tracking on an in-out basis of product being handled by a particular tool it is not possible to identify the source of a particular batch (lot) of product it is not possible to route a particular batch (lot) of product to the next processing step it is not possible to schedule a next batch (lot) of product using a proliferation of data screens, the operator can select and list lot(s) that need to be processed and can from there schedule the tool by which the lot is to be processed.

The advantages and objectives of the OMI support system of the invention are the following:

- operator can identify a tool that is under the operator's control
- an operator can identify tools by position of the tool in the processing stream such as an upstream tool, a downstream tool or a tool that is assigned to and located in other fabrication locations
- tool information is assigned to and displayed on a one tool per one screen basis; this eliminates having to analyze multiple entries on one screen that pertain to different tools
- users can supervise and control (execute) tool operation in real time
- users can monitor tool status or mode in real time, thus preventing for instance the idling of a tool
- users can identify the operational mode of a tool and can differentiate between for instance semi-automatic mode of operation (that is: an operator schedules a lot and enters lot related data into the MES system from where the lot can be assigned to be processed), manual and automatic mode of operation; these modes of tool operation are conveniently indicated by the color of the outline that relates to a tool
- sub-sections of a tool that can be independently controlled, such as a processing chamber, can be monitored.

With the above detailed functional capabilities in mind, the flow diagram of the OMI system of the invention that is shown in FIG. 1 will now become apparent, as follows:

1. level 10 of the system represents the users of the OMI system, these users may be in the form of human operators or may be numerically controlled tools that are users of and interface with the OMI system
2. level 15 represents the user set-up mechanism of the OMI system; this is an interface between an operator and the OMI system where parameters and conditions of control, status and response are made available to the human operator for either entry of these quantities or for observation of theses quantities; parameters and conditions of control (input to the OMI system), status (provided by the OMI system) and response (output from the OMI system) comprise all data that relate to the operation of tools that are applied in a semiconductor processing facility or to therewith related facilities
3. level 20 represents the user interface of the OMI system; this user interface has the function of interpreting all data that flow between level 15 of the OMI system and the MES function 25 of the OMI system; this function may include functions of formatting data, of detecting faulty entries, of screening for and highlighting entries according to data type or data source, of providing feedback to a human setup mechanism on level 15 of the system, of acting as a screening agent for data that are supplied by the MES function of the OMI system, and the like. User interface 15 can be implemented by using a commercially available software product such as is being supplied by software vendors such as IBM, DEC. etc.
4. level 25 represents the core hardware related functions of the OMI system; the MES function performs all functions of implementing and processing specific system requirements as these requirements relate to direct control of the semiconductor processing tools in addition to support functions such as product scheduling, logistics supply of product flow through the manufacturing facilities, statistical analysis relating the product manufacturing, cost analysis functions and identifying abnormalities in the results that are obtained, and the like
5. level 30 represents all tools, typically and preferably semiconductor processing tools, that are connected to and under control of the OMI system.

In addition to the specific functions that have been identified above, interfaces 10', 15', 20' and 25' have been highlighted in FIG. 1. These interfaces are hardware and software interfaces that enable the execution of the protocol that is established for the communication between the identified functions of the OMI system, as follows:

- interface 10' interfaces between level 10 and level 15 of the OMI system
- interface 15' interfaces between level 15 and level 20 of the OMI system interface 20' interfaces between level 20 and level 25 of the OMI system, and
- interface 25' interfaces between level 25 and level 30 of the OMI system.

From the above description it is clear that the OMI system of the invention provides for real time control of semiconductor processing tools, provides tool status on a real time bases either upon request or automatically, allows a human operator to schedule product, allows the automatic scheduling of product in addition to a host of other functions that can be readily implemented on a per function basis in the MES support package of the OMI system. All of these functions are in the broadest sense of the word related to the production of semiconductor devices and in this capacity are not limited to such functions as numerical tool control or other tool control related functions. These functions can be extended to include support functions that are required by semiconductor processing facilities in order to produce semiconductor product in a cost-competitive manner.

Although the OMI system of the invention has been described in terms of addressing, the OMI system can readily be extended and thereby be adapted to broader functions that also apply to the manufacturing of semiconductor devices. As examples of such functions can be cited:

- support software functions that are related to manufacturing semiconductor devices but that are not directly related to tool control and to the use and performance of semiconductor tools in a semiconductor manufacturing facility
- functions of interfacing with other software or hardware functions that are not part of the OMI system of the invention and that are not directly related to tool control and the use and performance of semiconductor tools in a semiconductor manufacturing facility
- functions of statistical analysis in support of OMI functions
- functions based on probability theory in support of OMI functions
- functions of supplying tool data to at least one of said tools under control of the OMI system
- interface functions with software or hardware functions that are not part of the OMI system for supplying tool data to at least one of said tools under control of the OMI system, and
- software interfaces between more than one user of the OMI system.

Specifically, the invention provides for: a computer operated method of supervision and operation of semiconductor facilities, referred to as the Operational Management Interface (OMI) system a user function, where human intervention with the OMI system is provided, the human intervention providing abilities to either submit data to the OMI system or by providing abilities to extract data from OMI system, whereby both functions of submission and extraction of data can be performed in either real-time mode and driven by the OMI system or can be driven by human intervention a user set-up function, forming an interface between an operator and the OMI system, where parameters and conditions of control, status and response are made available to the human operator for either entry of these quantities or for observation of theses quantities, whereby parameters and conditions of control are submitted the OMI system, whereby further parameters and conditions of status are provided by the OMI system, whereby further parameters and conditions of response are provided by the OMI system and comprise all data that relate to the operation of tools that are applied in a semiconductor processing facility or to therewith related facilities a user interface function, interpreting all data flowing between the user set-up mechanism of the computer operated method and a Manufacturing Execution System (MES) function of the OMI system, the user interface function including functions of formatting data, of detecting faulty entries, of screening for and highlighting entries according to data type or data source, of providing feedback to the human setup mechanism of the OMI system, of acting as a screening agent for data that are supplied by the MES function the OMI system a Manufacturing Execution System (MES) function, the MES function performing all functions of implementing and processing specific system requirements as these requirements relate to direct control of the semiconductor processing tools in addition to support functions such as product scheduling, logistics supply of product flow through the manufacturing facilities, statistical analysis relating the product manufacturing, cost analysis functions and identifying abnormalities in the results that are obtained a tool control function which represents all tools, typically and preferably semiconductor processing tools, that are connected to and under control of the OMI system hardware interfaces supported by two-way software protocols between the user function and the user set-up mechanism, between the user set-up mechanism and the user interface function, between the user interface function and the MES function, between the MES function and the tool control function the user function provides an interface to and support by functional capabilities of the Operational Management Interface (OMI) system provides the ability to:
identify a tool that is under operator control;
identify a tool by position of the tool in the processing stream such as an upstream tool and a downstream tool;
identify a tool as a tool that is assigned to and located in other fabrication locations;
assign tool information to a tool on a per tool basis;
display tool information on a per tool basis;
have tool related information being displayed on one display device in real time;
supervise tool operations in real time on a per tool basis and directed from one display device;
execute tool operations in real time on a per tool basis and directed from one display device;
monitor tool status in real time on a per tool basis and directed from one display device;
prevent idling of a tool;
identify operational mode of a tool and differentiate between semi-automatic mode of operation whereby an operator schedules a lot and enters lot related data into the OMI system resulting in the lot being assigned for processing and manual and automatic mode of operation;
sub-sections of a tool such as a processing chamber are independently monitored; and
sub-sections of a tool such as a processing chamber are independently controlled the Operational Management Interface (OMI) system provides software functions in support of the user function, such as:
identifying and tracking of a tool that is under operator control;
identifying and tracking of a tool by position of the tool in the processing stream such as an upstream tool and a downstream tool;
identifying and tracking of a tool as a tool that is assigned to and located in other fabrication locations;
assigning and tracking tool information to a tool on a per tool basis;
displaying and tracking tool information on a per tool basis;
displaying tool related information on one display device in real time;
supervising and monitoring tool operations in real time on a per tool basis and directed from one display device;
executing and monitoring tool operations in real time on a per tool basis and directed from one display device;
monitoring tool status in real time on a per tool basis and directed from one display device;
preventing idling of a tool;
identifying and tracking operational mode of a tool and differentiating between semi-automatic mode of operation whereby an operator schedules a lot and enters lot related data into the OMI system resulting in the lot being assigned for processing and manual and automatic mode of operation;
monitoring sub-sections of a tool such as a processing chamber; and
controlling sub-sections of a tool such as a processing chamber providing support software functions that are related to manufacturing semiconductor devices but that are not directly related to tool control and to the use and performance of semiconductor tools in a semiconductor manufacturing facility.

functions of interfacing with other software or hardware functions that are not part of the OMI system of the invention and that are not directly related to tool control and the use and performance of semiconductor tools in a semiconductor manufacturing facility further extended by providing functions of statistical analysis in support of OMI functions extending the functions by providing functions based on probability theory in support of OMI functions supplying tool data to at least one of the tools under control of the OMI system providing interface functions with software or hardware functions that are not part of the OMI system for supplying tool data to at least one of v tools under control of the OMI system.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A computer system for supervision and operation of a semiconductor facility, said system comprising:

a plurality of processing tools;

a manufacturing execution system to control said processing tools and to track manufacturing data;

a plurality of user set-up functions to selectively transfer user data from a plurality of users to said manufacturing execution system and to selectively transfer said manufacturing data from said manufacturing execution system to said users; and a user interface function to translate said manufacturing data prior to said transfer to said users and to translate said user data from said users prior to said transfer to said manufacturing execution system wherein said user interface function is further capable of detecting faulty entries in said user data and wherein said user interface function displays information on each said process tool of said plurality of process tools on a one tool per screen basis.

2. The system according to claim 1 wherein one of said users is a numerically controlled tool.

3. The system according to claim 1 wherein said user set-up function is capable of selecting a specific said processing tool.

4. The system according to claim 3 wherein said user set-up function is capable of tracking an operational mode of said selected processing tool.

5. The system according to claim 1 wherein said manufacturing data further comprises the results of statistical analysis of said manufacturing data.

6. A method of supervision and operation of a semiconductor facility, said method comprising:

providing a plurality of processing tools;

providing a computer system comprising:

a manufacturing execution system to control said processing tools and to track manufacturing data;

a plurality of user set-up functions to selectively transfer user data from a plurality of users to said manufacturing execution system and to selectively transfer said manufacturing data from said manufacturing execution system to said users; and a user interface function to translate said manufacturing data prior to said transfer to said users and to translate said user data from said users prior to said transfer to said manufacturing execution system wherein said user interface function is further capable of detecting faulty entries in said user data and wherein said user interface function displays information on each said process tool of said plurality of process tools on a one tool per screen basis; and monitoring said processing tool through said computer system.

7. The method according to claim 6 wherein one of said users is a numerically controlled tool.

8. The system according to claim 6 wherein said user set-up function is capable of selecting a specific said processing tool.

9. The system according to claim 8 wherein said user set-up function is capable of tracking an operational mode of said selected processing tool.

10. The system according to claim 9 wherein said manufacturing data further comprises the results of statistical analysis of said manufacturing data.

* * * * *